United States Patent
Hopper et al.

(10) Patent No.: US 6,617,069 B1
(45) Date of Patent: Sep. 9, 2003

(54) BATTERY OVER-DISCHARGE PROTECTION

(76) Inventors: George Frederick Hopper, 50 Loosen Drive, Maidenhead, Berkshire Sl6 3Ut (GB); Richard Penneck, 2 Westway, Lechlade, Gloucestershire GL7 3BT (GB); Masanori Furuta, Shalman Cop 1002, 9-11 Kibacho, Minato-ku, Nagoya City (JP); Takashi Sato, Evergreen Kishiwa 321, 5-1 Asahi-cho, Kashiwa City, Chiba Prefecture (JP); Shigefumi Torii, CO-Z Nishi Kan 205, 4-1-1 Kouzunomori, Narita City, Chiba Prefecture (JP)

( * ) Notice: Subject to any disclaimer, the term of this patent is extended or adjusted under 35 U.S.C. 154(b) by 0 days.

(21) Appl. No.: 09/787,346
(22) PCT Filed: Sep. 2, 1999
(86) PCT No.: PCT/GB99/02897
§ 371 (c)(1),
(2), (4) Date: Mar. 16, 2001
(87) PCT Pub. No.: WO00/16429
PCT Pub. Date: Mar. 23, 2000

(30) Foreign Application Priority Data

Sep. 16, 1998 (GB) .............................................. 9820132

(51) Int. Cl.$^7$ .............................................. H01M 10/48
(52) U.S. Cl. .......................................... 429/61; 429/62
(58) Field of Search ..................................... 429/61, 62

(56) References Cited

U.S. PATENT DOCUMENTS

| | | |
|---|---|---|
| 4,237,441 A | 12/1980 | Van Konynenburg et al. ........................ 338/22 R |
| 4,238,812 A | 12/1980 | Middleman et al. ........ 361/106 |

(List continued on next page.)

FOREIGN PATENT DOCUMENTS

| | | |
|---|---|---|
| DE | 31 48 860 A | 6/1983 |
| EP | 0 512 340 A | 11/1992 |

(List continued on next page.)

OTHER PUBLICATIONS

Patent Abstracts of Japan, vol. 1999, No. 05, May 31, 1999 & Japanese Publication No. JP 11–054110 A (N II C Mori Energy KK), Feb. 26, 1999 (abstract only).
European International Search Report for International Application No. PCT/GB99/02897 dated Dec. 22, 1999.
Great Britain Search Report for Application No. GB 9820132.0 dated Oct. 27, 1998.

*Primary Examiner*—Stephen Kalafut

(57) ABSTRACT

The present invention relates to an over-discharge preventing circuit, especially an over-discharge over-current preventing circuit, and more specifically relates to an over-discharge over-current preventing circuit comprising an over-discharge preventing circuit having a FET and an over-current preventing circuit for protecting the FET. The invention includes a primary or secondary battery containing such a circuit, and a battery pack containing such a circuit. The batteries comprising an over-discharge over-current preventing circuit according to the present invention have (1) an electrolyte, (2) a pair of electrode members forming a negative electrode member and a positive electrode member which electrically contact the electrolyte, (3) a pair of external connection terminals respectively electrically connected to corresponding electrode members and (4) a PTC element and FET with a source terminal and drain terminal serially connected between one of the electrode members and the corresponding external connection terminal, the gate terminal being connected to the other electrode member. The FET prevents over-discharge by stopping the supply of current to the external connection terminal when the voltage between the electrode members becomes lower than a predetermined value. The PTC element prevents over-current by stopping the supply of current to the external terminal when the current between the electrode members exceeds a predetermined value, thereby also protecting the FET from being destroyed by such an over-current.

18 Claims, 11 Drawing Sheets

U.S. PATENT DOCUMENTS

| | | | |
|---|---|---|---|
| 4,255,698 A | 3/1981 | Simon | 320/25 |
| 4,426,633 A | 1/1984 | Taylor | 338/25 |
| 5,179,337 A | 1/1993 | Staarman et al. | 320/13 |
| 5,319,515 A | 6/1994 | Pryor et al. | 361/93 |
| 5,363,030 A | 11/1994 | Ford et al. | 320/13 |
| 5,625,273 A | 4/1997 | Fehling et al. | 320/13 |
| 6,114,942 A * | 9/2000 | Kitamoto et al. | 429/62 X |
| 6,177,209 B1 * | 1/2001 | Okutoh | 429/62 |

FOREIGN PATENT DOCUMENTS

| | | |
|---|---|---|
| EP | 0 542 365 A | 5/1993 |
| EP | 0 644 642 A | 3/1995 |
| EP | 0 739 049 A | 10/1996 |
| EP | 0 849 815 A | 6/1998 |
| GB | 2279802 A | 1/1995 |
| GB | 2292845 A | 3/1996 |
| GB | 2310327 A | 8/1997 |
| WO | WO 91/07002 | 5/1991 |
| WO | WO 92/07402 | 4/1992 |
| WO | WO 92/07403 | 4/1992 |
| WO | WO 92/10878 | 6/1992 |
| WO | WO 92/12561 | 7/1992 |
| WO | WO 93/01639 | 1/1993 |
| WO | WO 94/00888 A | 1/1994 |
| WO | WO 94/11936 | 5/1994 |
| WO | WO 96/08846 A | 3/1996 |
| WO | WO 96/24170 A | 8/1996 |

* cited by examiner drain (to positive cap) 21
gate (to negative can) 22
20
source (to ptc part)

ptc part 32
FET on plastic substrate 31
cell negative 33
to cell positive 34
35
can (negative)

P-channel

N-channel

P-channel

N-channel

BATTERY OVER-DISCHARGE PROTECTION

BACKGROUND OF THE INVENTION

1. Field of the Invention

This invention relates to batteries, which may be re-chargeable ("secondary") batteries or non-rechargeable ("primary") batteries, with over-discharge protection and devices for use in connection therewith.

2. Introduction of the Invention

The use of control circuitry outside the battery casing or cell, but within the housing of a battery pack containing two or more cells, is well-known, with separate integrated circuits, circuit boards, and discrete FETs employed to sense and control cell behavior. Over-discharge, sometimes referred to as "deep discharge", means discharge of a battery to a level where irreversible damage occurs within the battery cell. This is undesirable, and U.S. Pat. Nos. 4,785,229 and 5,179,337, for example, describe various means for protecting rechargeable batteries from over-discharge by using protective circuits comprising field-effect transistors (FETs), for example a metal-oxide-silicon FET (MOSFET), coupled to conduct current from a re-chargeable battery to a load so long as the voltage potential across the battery is above the threshold which keeps the FET turned on. When the battery voltage drops below that threshold, the FET progressively turns off and reduces discharge to a negligible level, thus saving the battery from over-discharge.

SUMMARY OF THE INVENTION

The present invention relates to a much more convenient battery, which eliminates the need for separate coupling to an overdischarge protective device and, in one aspect, has a simple FET protection circuit, preferably mounted on a plastic substrate, which is housed within the battery cell itself. The invention is applicable both to primary and to secondary batteries. The invention accordingly provides a battery comprising positive and negative electrode materials in electrical contact with electrolyte material sealed within a casing (which may provide one of the electrode materials) provided with external positive and negative connection areas for electrical connection to load or other circuits when the battery is in use, wherein an over-discharge protection (ODP) circuit, preferably in the form of a semi-conductor device or integrated circuit, is provided within the casing and is electrically coupled between the electrode material and one of the said connection areas so as to substantially terminate discharge of the battery when the output voltage supplied by the battery falls below a predetermined level. The invention is useful with any battery which can be damaged by over-discharge, for example a nickel-cadmium battery or especially a lithium battery.

A preferred aspect of the present invention relates to a battery containing an over-discharge over-current preventing circuit, and more specifically relates to an over-discharge over-current preventing circuit composed of an over-discharge preventing circuit having a FET and an over-current protection element (PTC element) for protecting the FET, a primary or secondary battery having such an over-discharge over-current preventing circuit, and a battery pack comprising a plurality of primary or secondary batteries having such over-discharge over-current preventing circuits.

In this preferred aspect of the invention, consideration is also given to the problem of over-current when dealing with batteries. This is an effect wherein a battery will release excessive currents and generate heat when a short occurs in an electric circuit connected to the battery. Thus, it is necessary to protect the electrical circuits or batteries themselves from damage due to excessive currents and heat.

As devices for protecting electric circuits and the like from over-current, elements (PTC elements) having positive temperature coefficients composed of ceramics or preferably polymers are known. PTC elements composed of polymers (PPTC) are formed by dispersing particles of a conductive material inside a substrate composed of polymers, and while the electrical resistance of the device is extremely small while the current is less than or equal to a predetermined value, the electrical resistance will suddenly increase when the current exceeds the predetermined value, so as to substantially cut off the current. PPTCs are preferably such as to have the above-mentioned polymer layer sandwiched between two flat, parallel electrodes. For details on such devices, see U.S. Pat. Nos. 4,237,441, 4,238,812, 4,255,698, 4,426,633, and 5,801,612. Additionally, PPTCs can be obtained from Raychem Corporation under the product name "PolySwitch".

Thus, in addition to a FET over-discharge preventing device, this preferred aspect of the invention advantageously includes protection against over-current, thus reducing the risk of the battery and/or the FET for protection against over-discharge being damaged by over-current if such an over-current phenomenon occurs. This combined OD and OC protection is especially advantageous when provided inside batteries or battery packs having a plurality of batteries, thus making replacement of damaged protective circuits difficult.

This aspect of the present invention was made in consideration of the above-described problems associated with the prior art, and has the object of offering a battery having an over-discharge over-current preventing circuit capable of retaining over-discharge protection capabilities even after the occurrence of an over-current phenomenon.

This aspect of the present invention has the further object of offering a battery pack having such an over-discharge over-current preventing circuit, and of offering such an over-discharge over-current preventing circuit.

In order to achieve the above purpose, a battery offered based on a first aspect of the present invention comprises (a) an electrolyte; (b) a positive electrode member and a negative electrode member in electrical contact with the electrolyte; (c) a pair of external connection terminals respectively connected electrically to corresponding electrode members; and (d) an over-discharge over-current preventing circuit comprising a FET and PTC element, the PTC element and a source electrode and drain electrode of the FET being serially connected between one of the electrode members and the corresponding external connection terminal, the gate electrode of the FET being connected to the other electrode member, the FET preventing over-discharge by stopping a supply of current to the external connection terminal when the voltage between the electrode members drops below a predetermined value, and the PTC element preventing over-current by restraining the supply of current to the external connection terminal when the current between the electrode members exceeds a predetermined value, thereby also protecting the FET from being damaged by an over-current.

Additionally, a battery pack offered based on a second aspect of the present invention comprises (a) a plurality of primary batteries comprising an electrolyte and a positive electrode member and a negative electrode member in electrical contact with the electrolyte; (b) a pair of external connection terminals respectively connected electrically to corresponding electrode members; and (c) an over-discharge over-current preventing circuit comprising a FET and PTC element, preferably within the battery pack, the PTC element and a source electrode and drain electrode of the FET being serially connected between one of the electrode members and the corresponding external connection terminal, the gate electrode of the FET being connected to the other electrode member, the FET preventing over-discharge by stopping a supply of current to the external connection terminal when the voltage between the electrode members drops below a predetermined value, and the PTC element preventing over-current by restraining the supply of current to the external connection terminal when the current between the electrode members exceeds a predetermined value, thereby also protecting the FET from being damaged by an over-current.

Furthermore, an over-discharge over-current preventing circuit offered based on a third aspect of the present invention comprises a PTC element and FET; the PTC element and a source electrode and drain electrode of the FET which are to be serially connected between one of the electrode members and the corresponding external connection terminal, the gate electrode of the FET which is to be connected to the other electrode member; the FET preventing over-discharge by stopping a supply of current to the external connection terminal when the voltage between the electrode members drops below a predetermined value, and the PTC element preventing over-current by restraining the supply of current to the external connection terminal when the current between the electrode members exceeds a predetermined value, thereby also protecting the FET from being damaged by an over-current.

According to this aspect of the present invention, it is possible not only to protect batteries and external circuits connected thereto against over-discharge phenomena and over-current, but also to retain over-discharge protection capabilities even after the occurrence of over-current phenomena. Additionally, the present invention allows the effective lifetimes of batteries to be prolonged as a result of protecting the FETs during over-current phenomena, and is further capable of effectively eliminating problems such as potential explosions occurring due to a reverse bias being applied to the batteries.

Other characteristics and advantages of the present invention shall be made clearer by the description of modes for carrying out the invention which shall be made with reference to the attached drawings.

DETAILED DESCRIPTION OF THE INVENTION

Preferably, the ODP circuit comprises a field-effect transistor (FET), preferably a MOSFET, electrically connected to break the circuit between the battery electrode material and one of the said connection areas when the said output voltage falls to a level at which the FET substantially ceases to conduct. The cut-off voltage may be controlled by selection of the FET characteristics. It will often be preferable that the FET has its source electrically connected to one of the said electrode materials and has its drain electrically connected to the associated one of the said external connection areas and has its gate electrically connected to the other of the said electrode materials and to the associated other one of the connection areas.

When the FET is of the p-channel type, it is preferably located at the positive end of the battery, whereas a FET of the n-channel type is preferably located at the negative end of the battery.

For convenient temperature control, the electrical connection to the gate of the FET may be effected via a positive-temperature-coefficient (PTC) element. For example, a PTC fiber or tape or track on a substrate could be used to make the gate connection, thus switching off the FET when the cell temperature rises above the PTC switch-off threshold.

In preferred forms of the invention, an over-current protection (OCP) device is enclosed within the casing together with the ODP circuit, preferably in close physical contact therewith. The OCP device may for example comprise a known PTC element, either a ceramic PTC element or preferably a polymeric positive-temperature-coefficient (PPTC) device comprising a conductive polymer composition of organic polymeric material filled with electrically conductive particles. The conductive polymer composition is preferably sandwiched between two laminar electrodes, for example as described in U.S. Pat Nos. 4,237,441, 4,238, 812, 4,255,698, 4,426,633, and 5,801,612. Suitable PPTC devices are sold by Raychem Corporation under the trademark "PolySwitch".

The ODP circuit and the OCP device may be fixed together to form a single unit. The invention accordingly includes as another of its aspects such a unit for use in a battery, the unit comprising the said ODP circuit fixed together with the said OCP device. Another form of the OCP device comprises a semiconductor integrated circuit device, and the OCP integrated circuit may be combined with the ODP circuit in a single semiconductor integrated circuit device. An integrated circuit device suitable for use as the said single device in a battery is accordingly also included in the invention.

Another broad aspect of the invention provides a battery having an external casing and having over-current and over-discharge protection combined in a single unit located within or outside the battery casing.

The present invention offers an extremely safe and highly stable battery having an over-discharge over-current preventing circuit, a battery pack having similar properties, and an over-discharge over-current preventing circuit. According to the best mode for carrying out the present invention, a so-called PTC element having a positive temperature coefficient, preferably a polymer PTC (PPTC) element is used as the basic structural element of the over-current preventing circuit, and a FET, preferably a MOSFET, is used as an over-discharge preventing element. More preferably, the over-discharge preventing element is formed together with other necessary electrical devices on a single substrate as a solid-state circuit, and is housed inside a battery or battery pack together with the over-current preventing element.

With regard to the FET, the source electrode is connected to the positive or negative electrode member of the battery, the drain electrode is connected to the external terminal side, and the gate electrode is connected to the negative or positive electrode member, that is, the electrode member which is not connected to the source electrode. Additionally, if the FET is p-type, then it is preferable that the FET be provided on the positive electrode side of the battery, and if the FET is n-type, then it is preferable that the FET be provided on the negative electrode side of the battery. The PTC element can be inserted in series with the gate of the FET between the positive or negative electrode member of the battery and the source electrode of the FET, or can be connected in parallel with the gate of the FET. Additionally, the PTC element can be provided between the electrode member and external terminal on the side to which the FET is not connected.

If the voltage of the battery, or more precisely, the voltage between the source electrode and gate electrode of the FET is higher than a predetermined threshold value, then the resistance between the source electrode and gate electrode of the FET will be small enough to ignore in actual practice, so that if the FET is considered to be a switch, the switch is closed, and the battery outputs a predetermined voltage. However, if the voltage of the battery, or more precisely, the voltage between the source electrode and gate electrode of the FET goes lower than the predetermined threshold value, then the resistance between the source electrode and drain electrode of the FET will suddenly rise, whereby a state where in the switch is in the open state is simulated. Consequently, in this state, the battery will not output an electrical current.

If the current of the circuit including the battery exceeds a predetermined threshold value for some reason, then the PTC element, which is preferably provided at a position where almost all of the current from the battery flows therethrough, will cut off the current, so as to protect the external circuitry, battery and FET from damage due to over-current. In this case, the time required for the PTC element to cut off the current when an over-current occurs must be faster than that by which the external circuitry, battery and FET will be damaged due to the over-current. Preferably, the cut-off time of the PTC element is shorter than the damaging time of the FET.

According to one mode of the present invention, a PPTC having an over-current preventing function, a FET having an over-discharge preventing function and other electrical devices are all housed inside the battery. According to a different mode, a battery pack comprising a plurality of batteries internally houses a PPTC having an over-current preventing function and a FET having an over-discharge preventing function. Additionally, according to a further mode of the present invention, an over-discharge over-current preventing circuit is composed of a PPTC having an over-current preventing function, a FET having an over-discharge preventing function and other electrical devices.

BRIEF DESCRIPTION OF THE DRAWINGS

Forms of the invention are shown by way of example in the accompanying drawings, wherein.

DETAILED DESCRIPTION OF THE DRAWINGS

Figure 1:
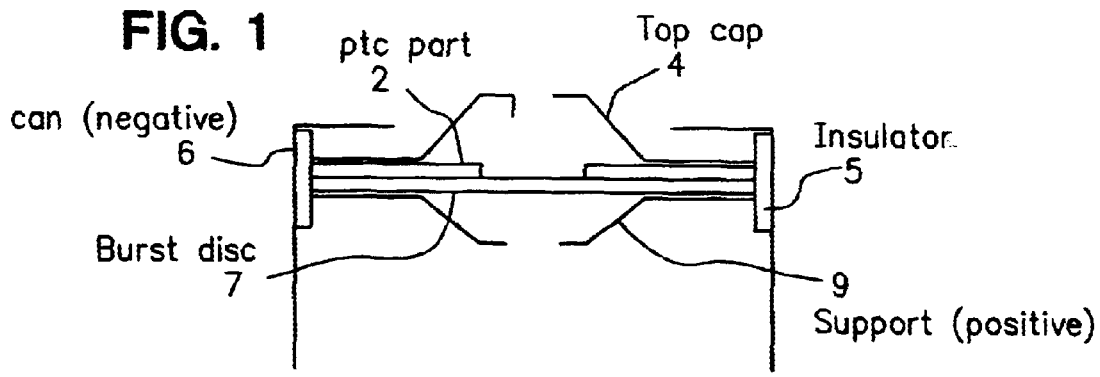
FIG. 1 shows schematically a typical lithium cell cap.
Figure 2:
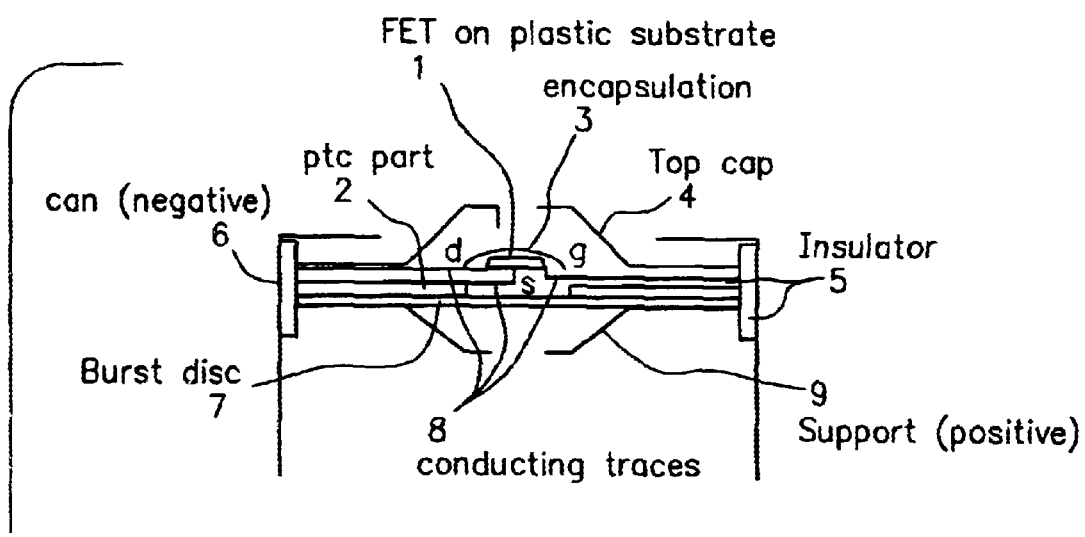
FIG. 2 shows the cap of FIG. 1 with the FET added.
Figure 2:
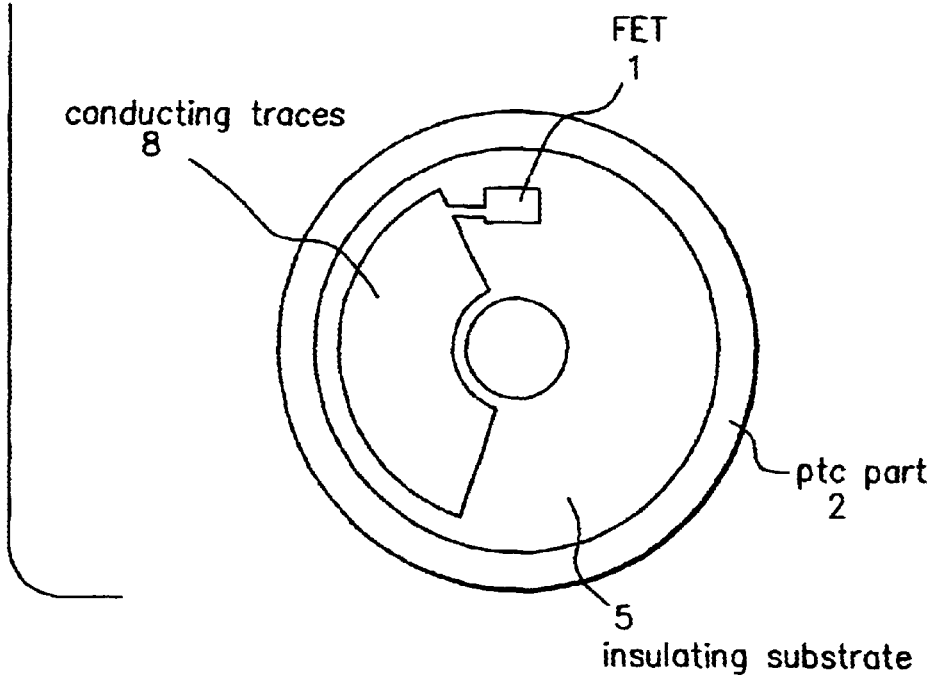

Referring to the drawings, FIG. 1 shows schematically the structure of a typical lithium cell cap, while FIG. 2 shows the cap with the FET added. FIG. 1 is a section view of a normal lithium primary battery provided with a conventional over-current preventing element on the positive electrode side of the battery. A supporting member 9 which supports the positive electrode member is electrically connected to the PTC element 2 via a pressure plate 7, and the PTC element 2 is also electrically connected to the positive external terminal 4. All of the parts described above are electrically insulated by means of an insulating member 5 from the sheath 6 which is the negative external terminal.

FIG. 2($i$) is a section diagram showing a primary battery provided with an over-discharge over-current preventing device of the present invention on a positive electrode side. FIGS. 2($ii$) and 3 are a schematic plan view as seen from above and schematic perspective view of a cross section showing the interior of the example shown in FIG. 2($i$). The same reference numbers are used to indicate parts which are the same as in the conventional primary battery described above. In the mode of the present invention shown in FIG. 2($i$), a conductor 8 mounted onto a PTC element with an insulating layer therebetween and a p-type FET 1 covered with an encapsulation 3 are provided-in addition to the parts of the conventional example described above. The source electrode 20 of the FET is connected through the insulating layer to the PTC element, the drain electrode 21 is connected to the positive external terminal, and the gate electrode 22 is connected through the insulating member 5 to the sheath 6 which is the negative external terminal. The terminals of the FET are connected by methods such as crimping to the conductor. This example has the circuit structure of the circuit shown in FIG. 15.

Figure 3:
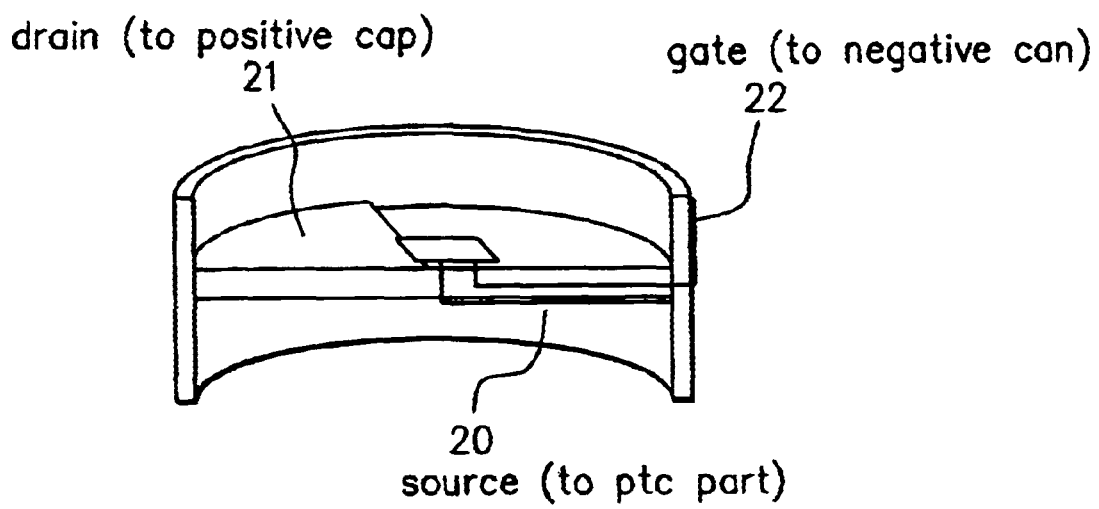
FIG. 3 shows a perpective view of the FET and substrate.

FIG. 3 shows a perspective view of the FET and substrate. Shown here as a three-dimensional part, the substrate could alternatively consist of a laminated sheet such as a small area of flexible multilayer printed circuit board material. The main features are the conducting layers on the upper and lower surfaces to provide the source and drain contacts, and a third conductor embedded within the layer to provide the gate contact. The FET is envisaged to be in the form of a naked die which is mounted on a plastic substrate, then bonded and encapsulated. In this respect the chip packaging step would resemble the low-cost manufacturing process used for smartcards.

Figure 4:
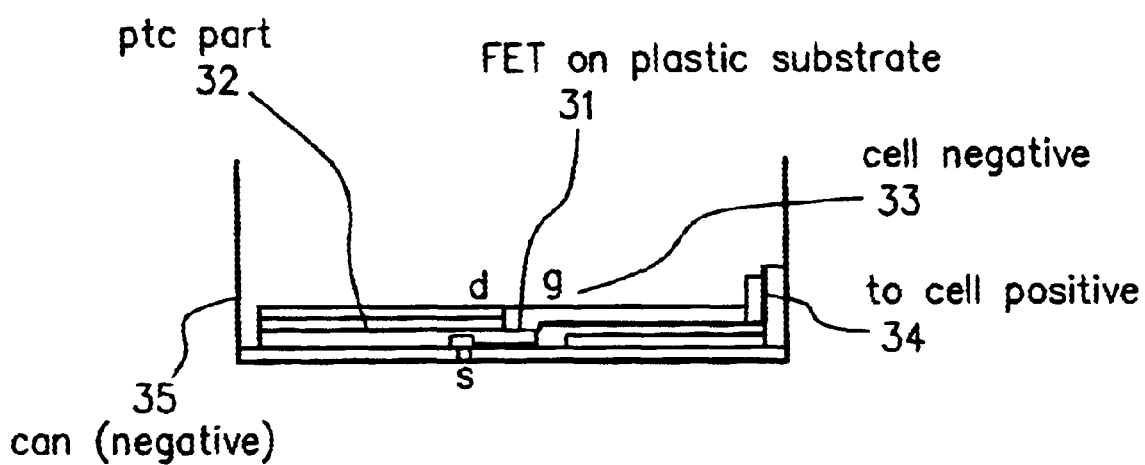
FIG. 4 shows one possible location for an n-channel FET.

Locating the FET at the positive end of the cell, as shown in FIG. 2, favours the use of a p-channel device. To minimise on-state resistance, it would be desirable to employ an n-channel FET, in which case the preferred location would be at the negative end of the cell. FIG. 4 illustrates one such possibility. Especially in this, and preferably in all other arrangements, suitable sealing or encapsulation, which may be known per se, is desirable to protect the FET and associated components from the cell chemicals with which they are or may become in contact.

FIG. 4 shows a cross section of a primary battery containing an over-discharge over-current preventing device on the negative electrode side. A FET 31 and PTC element 32 are provided via an insulating layer contacting the negative electrode member 33, with the source electrode of the FET being connected to the PTC element, the drain electrode connected to the sheath 35 which is the negative external terminal and the gate electrode connected to the positive electrode member via the conductor 34. The circuit structure corresponds to the circuit shown in FIG. 9.

Figure 5:
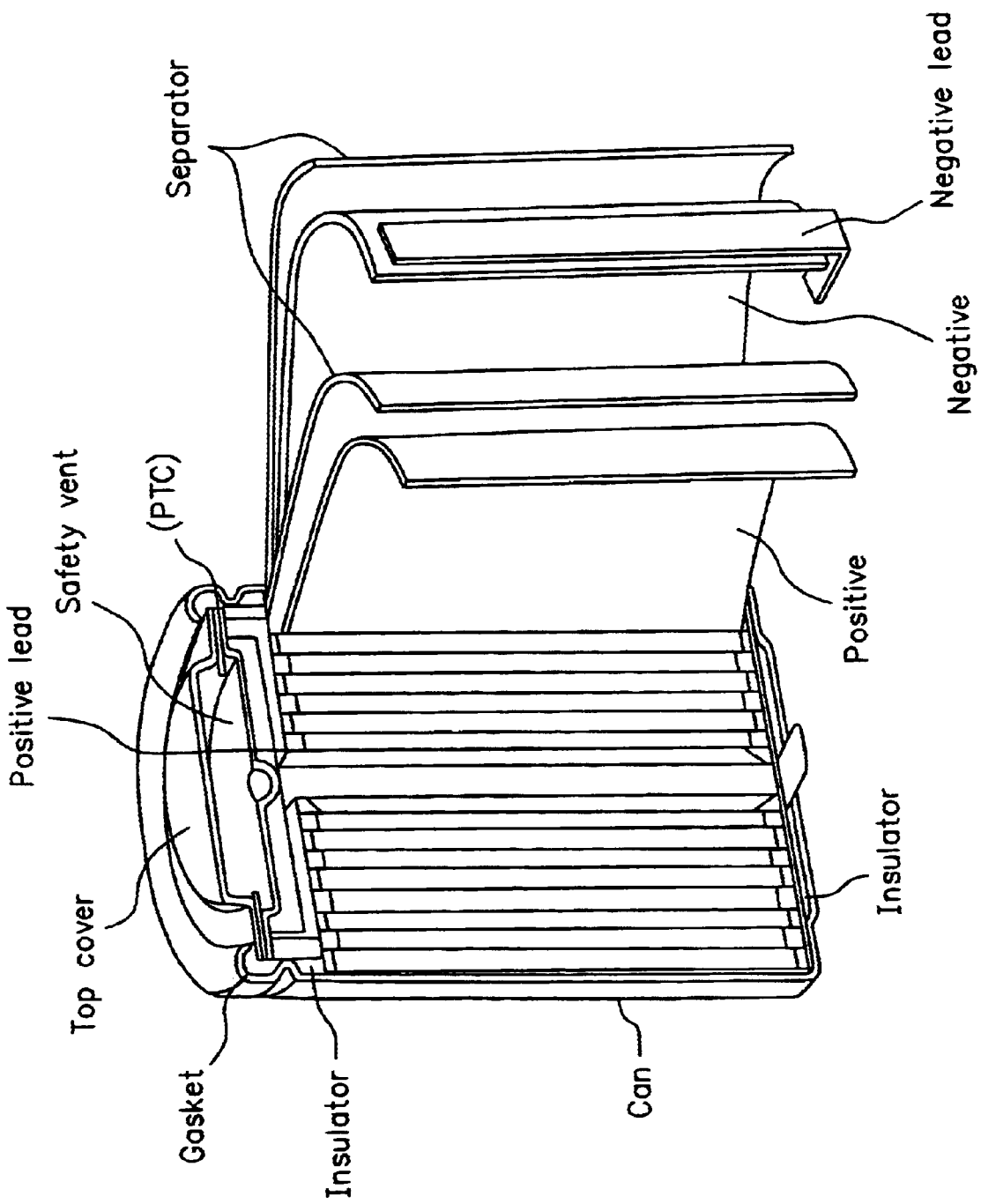
FIG. 5 shows the structure of a typical cell.

For both of the proposed FET locations the most difficult connection is that from the gate electrode. In the case of the p-channel FET the gate contacts the negative can, while in the n-channel case the gate contacts the positive cell terminal. FIG. 5 shows the internal structure of a typical cell ["Modern Batteries" ed. Vincent and Scrosati, John Wiley 1997]. It should be noted that in both configurations a considerable resistance can be tolerated in the gate connection because of the high intrinsic gate resistance of the FET. This can accomodate the aforementioned PTC connections which may be useful for addition of over-temperature protection to the cell.

Figure 6:
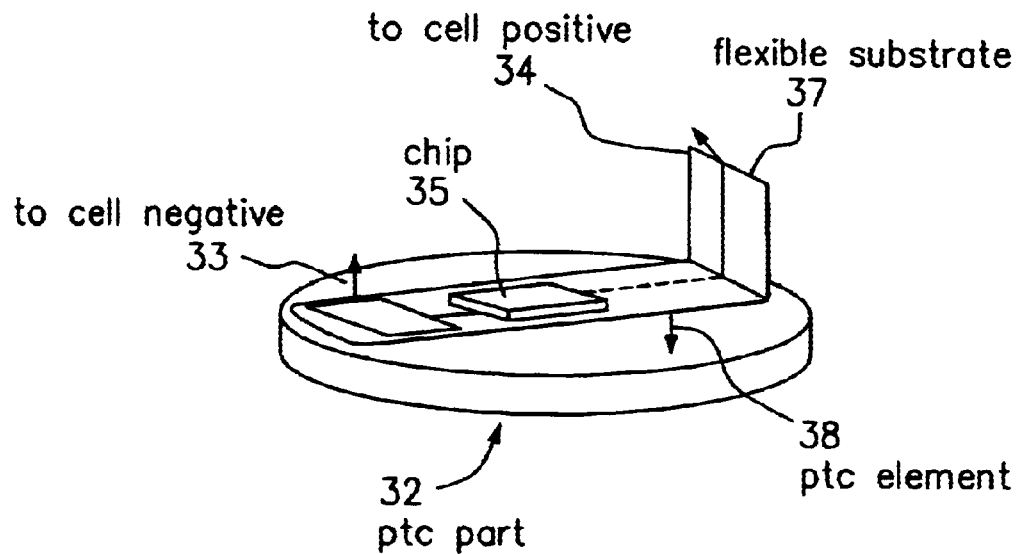
FIG. 6 shows a possible combined OD+OC device.

It may be possible to supply a tape-mounted over-discharge FET in combination with over-current protection, such as a known PTC device, as a single part. FIG. 6 illustrates the combination schematically. A further possibility, discussed in more detail later, would be to integrate the over-current and over-discharge functions together in silicon, in which case the component would reduce to a single integrated chip (FIG. 7), or to a plurality of separate chips connected together to provide the various protective functions.

Figure 7:
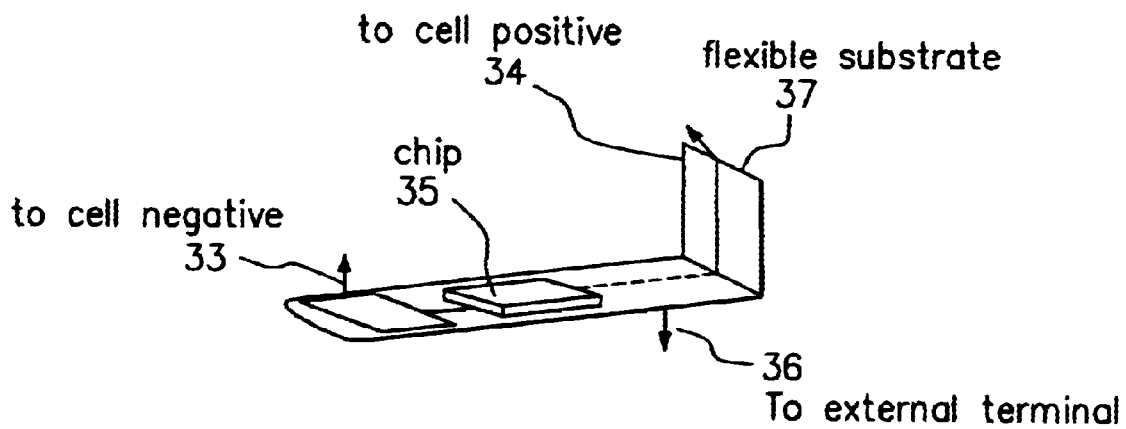
FIG. 7 shows a possible integrated circuit combined OD+OC device.

FIGS. 6 and 7 are perspective views showing portions of the over-discharge over-current preventing device on the negative electrode side. The conductor 34 which connects the gate electrode with the positive electrode member is insulated from the sheath which is the negative electrode by means of an insulating layer 37.

In the above modes, the FET and PTC element were provided near each other on the same side of the battery, but the structure of the present invention is not so restricted, and it is possible to have the PTC element on the positive electrode side and the FET on the negative electrode side, or vice versa. In FIG. 6, element 38 shows a connection between the FET 35 and PTC element 32. In FIG. 7, element 36 is a connection from FET 35 to an external terminal.

Figure 8:
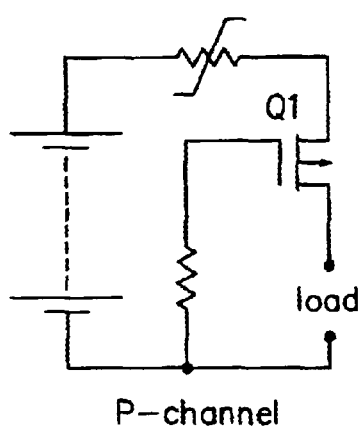
FIGS. 8 & 9 are circuit diagrams showing the most basic circuit structure of the over-discharge over-current preventing circuit of the present invention, using a single FET and PTC element.
Figure 9:
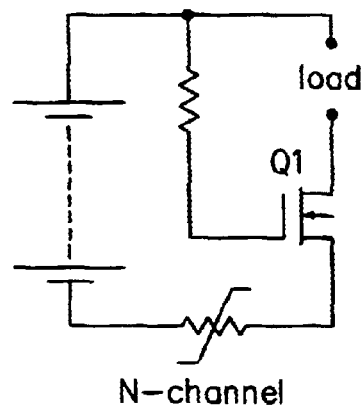

Examples of the over-discharge circuit are shown in FIGS. 8 and 9 for both device polarities, the FET in the main current path being identified as Q1 in these and in subsequent circuit diagrams. Operation is as follows. When the cell voltage exceeds the threshold voltage of the FET, the transistor conducts, and the battery provides current as normal. As the voltage falls below the FET threshold, then the FET turns off progressively over a small voltage range and finally reduces the further discharge of the cell to an insignificant level. The threshold voltage of the FET should be chosen to suit the desired cut-off voltage of the cell, and may be, for example, somewhere in the region from 1 to 3 Volts, depending on the discharge characteristics and current delivery required of the cell.

Figure 13:
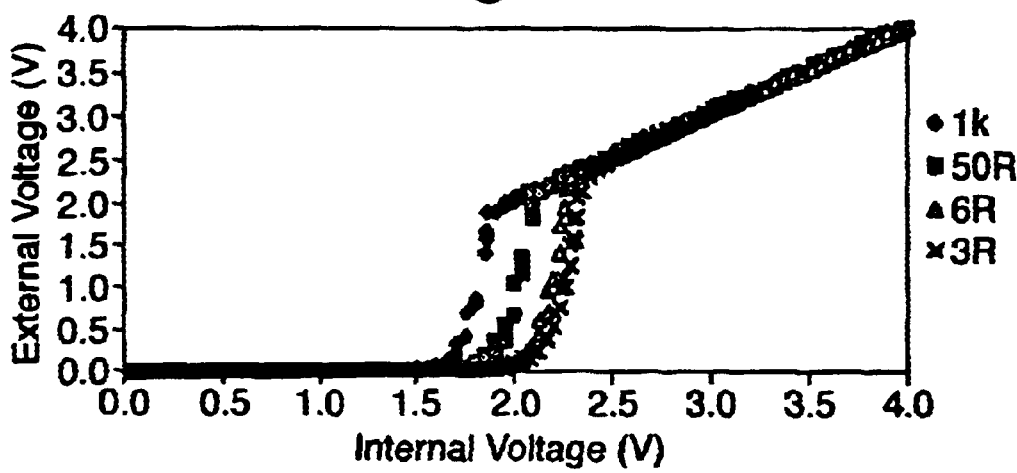
FIGS. 13 & 14 are graphs showing performance of the circuits of FIGS. 9 & 12.

The circuit of FIG. 9 has been verified using a variable DC source to simulate the battery. Performance-enhancing properties of the FET include accuracy and stability of the threshold voltage and a suitably low on-resistance, the latter being strongly related to the cost of the FET. FIG. 13 is a plot of $V_{out}$ vs $V_{in}$ showing an example of the performance of this circuit in which the FET chosen is an IRL 3803 device from International Rectifier. The voltage available in the external circuit is plotted as a function of voltage at the supply terminals, at several values of the external load resistor, that is at 1000, 50, 6, and 3 ohms.

Figure 14:
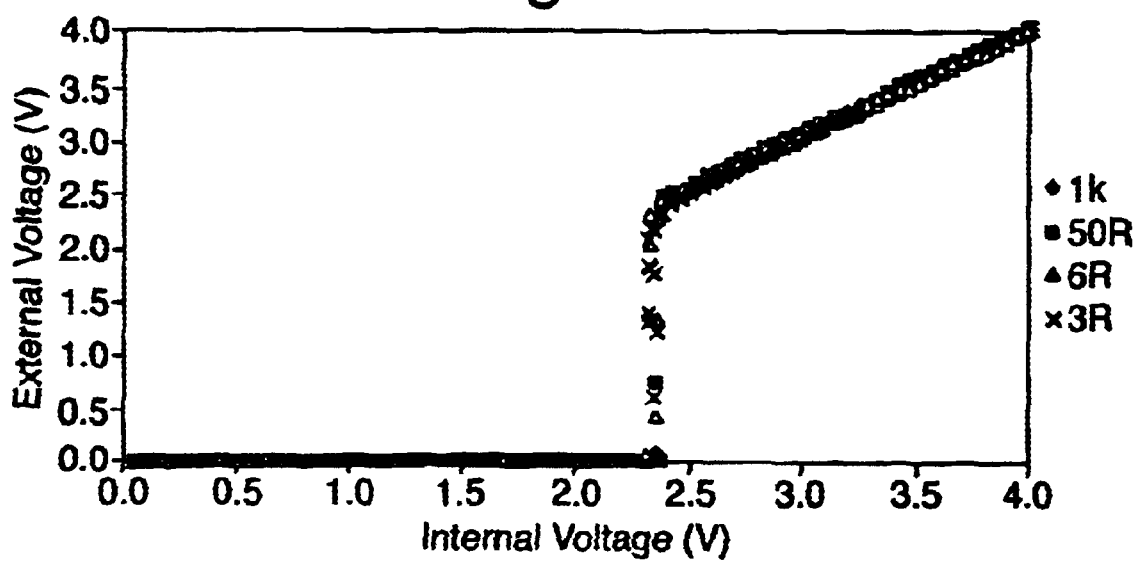

Resistance of the FET at voltages close to its threshold voltage leads to the dependence of external voltage on load seen in FIG. 13. In some cases this is advantageous, allowing the output voltage reduction to apply progressively as the current demand increases. In other cases, where it is desirable to reduce the dependence of output voltage on current demand, this reduction can be achieved by the use of a FET of higher transconductance, and/or the use of a circuit exemplified by FIG. 12, the performance of which circuit is illustrated in FIG. 14 using a FET of the aforementioned type IRL 3803.

Additional performance refinements may be added, at the expense of increased circuit complexity. For example the dependence of the circuits on the threshold voltages of the FETs may be reduced by employing a comparator in conjunction with a voltage reference device, as is well known per se. Alternatively, or in addition, a DC-DC converter may be used in order to provide a voltage different to that obtained directly from the battery, thereby increasing the useful range of FET types. The application of a DC-DC converter to over-current protection circuits has been disclosed in U.S. Pat. No. 5,319,515.

Figure 10:
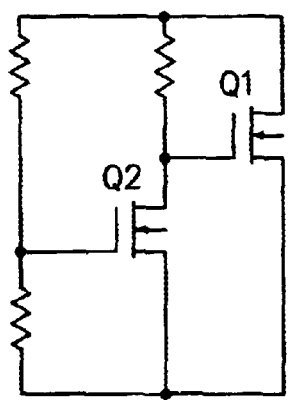
FIG. 10 shows a basic OC protection circuit.

The FET discharge protection circuit could be combined with FET-based over-current protection. FIG. 10 shows a basic over-current protection circuit. More elaborate versions (auto-resetting, low voltage burden, temperature compensated, etc.) have been described, for example, in Raychem International published patent specifications WO 92/07402, WO 92/07403, WO 92/12561, WO 9210878, WO 93/01639, and WO 94/11936.

Figure 11:
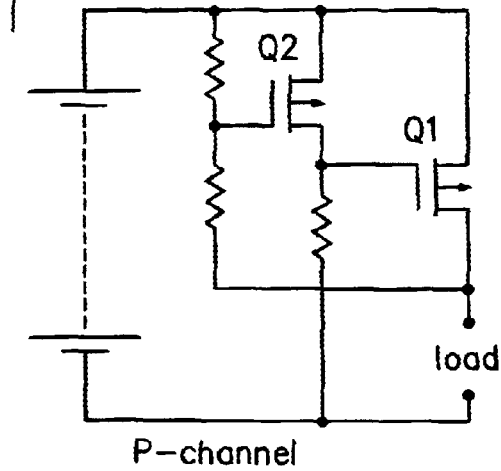
FIG. 11 shows a combined OD+OC protection circuit.
Figure 11:
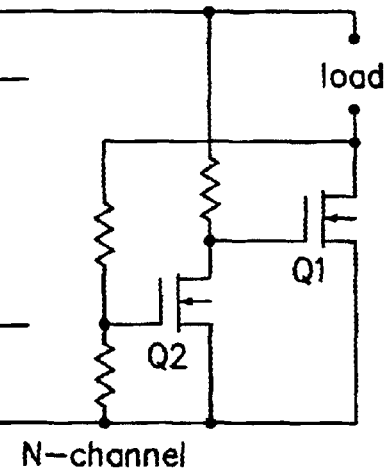

The combination of over-current with over-discharge protection is obtained in the circuits of FIG. 11. Briefly, the operation of the circuits in FIG. 11 is as follows. As the battery voltage dips, either due to discharge or to excessive current, the FET in the main path switches off. In the case of excessive current, the switch-off is assisted by the second FET, which maintains the open-circuit condition until the abnormal load is removed.

The combined circuit offers the following advantages over individual over-discharge and over-current circuits:
 (i). Only a single device appears in the main current path, alleviating the low on-resistance requirement. (ii). The voltage needed to operate the FET is provided independently from the main current-flow path, thus offering a performance advantage over a straightforward combination of two separate devices. (iii). If temperature-dependence is an issue it is possible to incorporate comparator-based versions of the aforementioned published circuits, which have been shown to provide highly temperature-independent operation from −40 to 120° C.

FIG. 8 is a circuit diagram showing the basic circuit structure of a battery having an over-discharge over-current preventing circuit according to the present invention. In the drawing, the terminals at the portion marked "load" are a positive external terminal and a negative external terminal, and external circuitry is connected at this portion marked "load". In the case of the circuit structure shown in the drawing, a PTC element and p-type FET are provided in order in a direction going from the electrode member to the external electrode at a position between the electrode member on the positive electrode side and the positive external terminal, that is, a position inside the battery adjacent to the positive external terminal. The source terminal of the FET is connected on the PTC element side, and the drain electrode is connected on the positive external terminal side. On the other hand, the gate electrode of the FET is connected between the negative electrode member and the negative external terminal.

If the voltage of the battery is greater than or equal to a threshold value in a normal state of use in which the current is less than a threshold value, then the electrical resistance of the PTC element becomes small enough to ignore, and consequently, the voltage between the source electrode and gate electrode of the FET is roughly equal to the voltage of the battery, so that a current is allowed to flow between the source electrode and drain electrode of the FET. In other words, the battery outputs a voltage between the external terminals. If the voltage of the battery goes lower than the threshold value, then the FET cuts off the current between the source electrode and drain electrode, as a result of which the voltage between the external terminals is made essentially zero. Additionally, when the external electrode is shorted and the current exceeds the threshold value, then the resistance of the PTC will suddenly increase so as to make the voltage between the external electrodes essentially zero as well.

FIG. 9 shows the basic structure of an over-discharge over-current preventing circuit using an n-type FET. Unlike the case of FIG. 8 shown above, the FET is connected between the negative electrode member and negative external terminal of the battery, and is therefore normally positioned near the negative external terminal of the battery, and the gate electrode is connected between the positive electrode member and the positive external terminal of the battery. In this case as well, if the voltage of the battery exceeds a standard threshold value and the current is less than a threshold value, then the electrical resistance of both the PTC element and FET will be essentially zero, and the battery will output a voltage between the external terminals as in the above-described case of FIG. 8. It is also similar to the above-described case in that the current between the external terminals will become essentially zero if the voltage of the battery drops below the threshold value or the current exceeds a threshold value.

Figure 15:
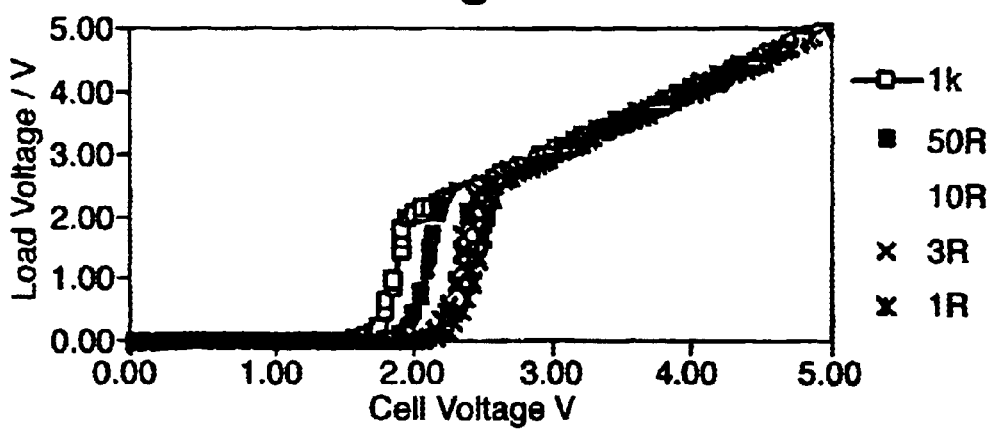
FIGS. 15–17 are graphs showing the results of a test to confirm the over-discharge preventing properties of the present invention performed using the basic circuit structure.
Figure 16:
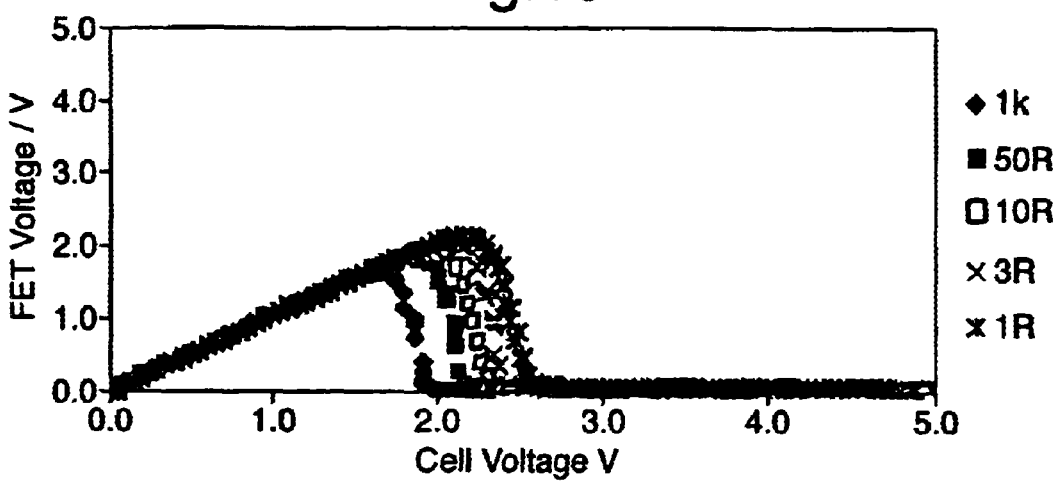
Figure 17:
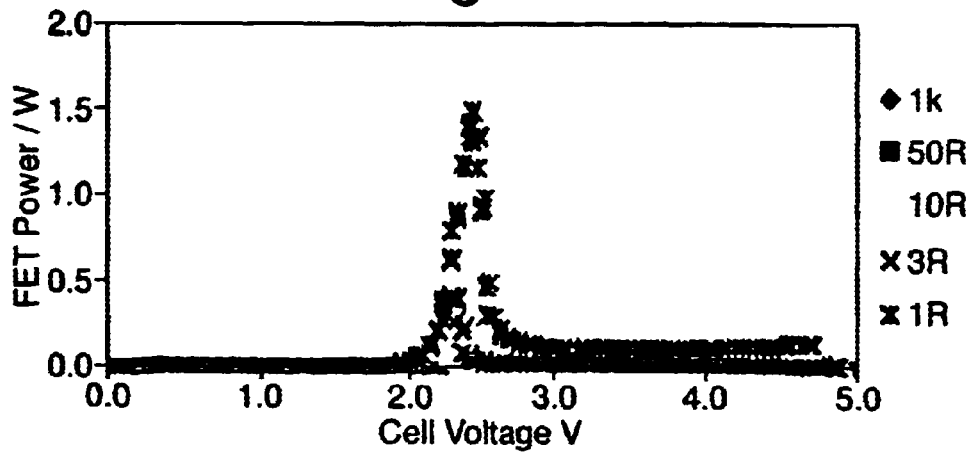

FIGS. 15–17 are graphs showing the results of tests performed to confirm that the FET will cut off the current when the voltage of the battery drops below the threshold value. However, in the tests, a variable DC current (hereinafter referred to as a "battery voltage" for the purposes of simplicity) was supplied to the circuit using a transformer instead of the battery. As the resistance between the external terminals (hereinafter referred to as "external resistance"), five types of resistance of from 1Ω to 1Ω were used.

FIG. 15 shows the battery voltage on the horizontal axis and the voltage applied to the external resistance on the vertical axis. Although there are slight differences in the behavior according to the values of the external resistance due to the effects of the resistance of the FET and PTC element themselves, when the battery voltage is in the range of at least 2 V, the battery voltage and voltage applied to the external resistance are roughly the same, and the FET resistance can be ignored. However, when the battery voltage is in the range of less than 2 V, the voltage applied to the external resistance is zero, which indicates that the FET has cut off the current. This voltage of around 2 V where a sudden change occurs is the threshold value of the FET.

FIG. 16 shows the battery voltage on the horizontal axis as with FIG. 15, and shows the voltage between the source electrode and gate electrode of the FET on the vertical axis (hereinafter referred to as "FET voltage"). When the battery voltage is in a range exceeding the threshold value, the FET voltage is zero, which indicates that the resistance of the FET is zero. On the other hand, if the voltage of the battery goes below the threshold value, the FET voltage becomes equal to the battery voltage, which indicates that the FET resistance can be considered to be infinite.

When considering the above tendencies indicated in FIGS. 15 and 16, the FET shows drive properties wherein the resistance is roughly zero when the battery voltage is larger than the threshold value (corresponding to an open switch), and is roughly infinite when the battery voltage is less than the threshold value (corresponding to a closed switch). FIG. 17 shows the output of the FET, and indicates that some heat is generated when the battery voltage is close to the threshold value.

Figure 12:
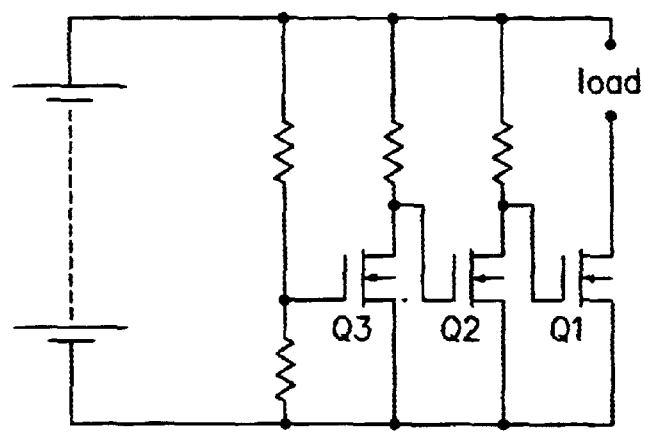
FIG. 12 is a circuit diagram showing the circuit structure of the over-discharge preventing circuit of the present invention using three FETs and having reduced dependence of output voltage on current.

While the above test results clearly show the switching properties or cut-off properties of the FET, they also indicate that the threshold value of the voltage slightly depends on the external resistance. While this structure can be considered to be sufficient for general use, FIG. 12 shows a circuit structure in which the effects of the external resistance are eliminated and switching is performed at a constant threshold value. FIG. 12 is a circuit wherein three n-type FETs are connected in a cascade, wherein a FET Q1 is connected between the negative electrode member and the negative external terminal, a drain electrode of a FET Q2 connected in parallel between the FET Q1 and the external resistance is connected to the gate electrode of FET Q1, and the drain electrode of a FET Q3 connected in parallel between the above and the gate electrode of the FET Q2 is connected to the drain electrode of FET Q2. A partial voltage from the battery is applied to the gate electrode of the FET Q3. This structure differs from the structures of FIGS. 8 and 9 in that a plurality of FETs are connected in a cascade and in that the gate electrode of the FET (Q3) receives not the entire voltage of the battery, but a partial voltage.

By supplying the gate electrode with a partial voltage by using two resistances, it is possible to cut off the current not when the entire voltage of the battery goes below the threshold value, but when a portion of the voltage of the battery goes below the threshold value. In other words, the threshold voltage of the circuit can be varied separately from the threshold value of the FET by supplying a partial voltage to the gate electrode.

Figure 18:
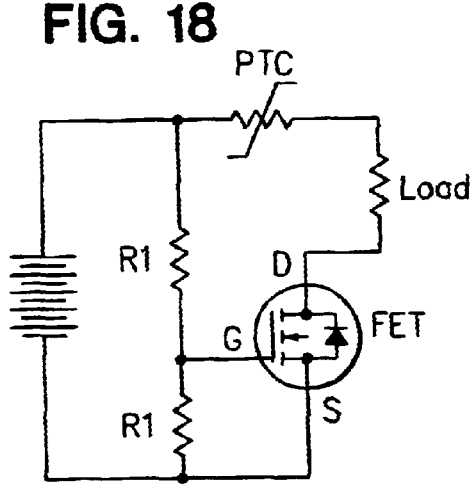
FIG. 18 is a circuit diagram showing the circuit structure whereby a FET is activated by receiving a portion of the battery voltage.

FIG. 18 is a circuit diagram showing schematically a method for adjusting the active voltage of the FET independently of the voltage supplied to the external resistance by arranging the resistors R1, R2 so that the FET will receive a partial voltage from the battery.

Figure 19:
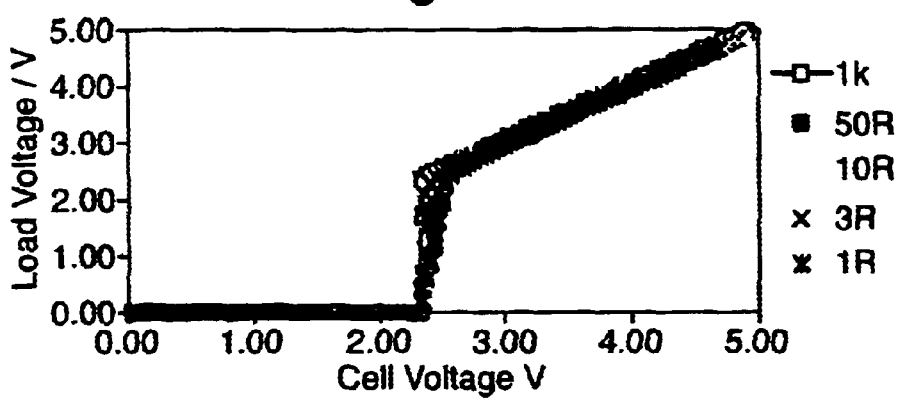
FIGS. 19–21 are graphs showing the results of a test to confirm the over-discharge preventing properties of the present invention performed using the circuit having three FETs.
Figure 20:
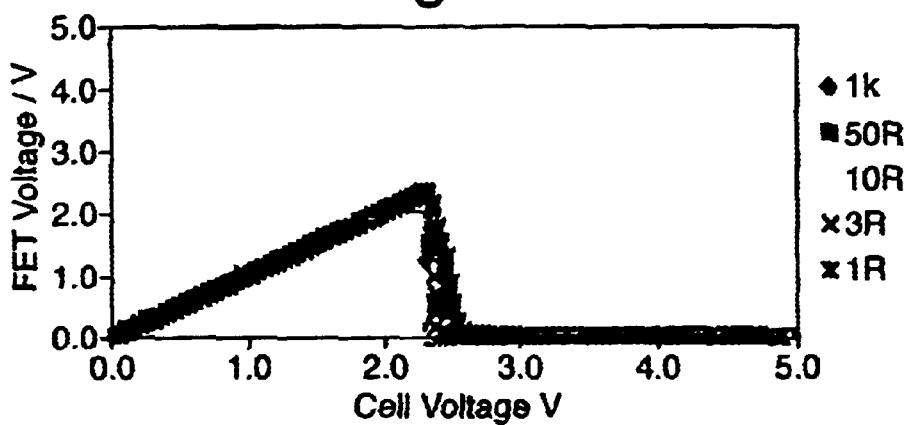
Figure 21:
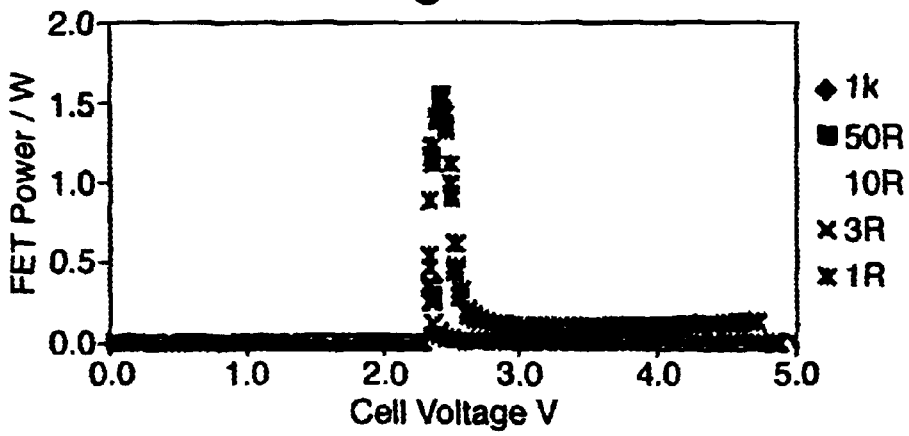

FIGS. 19–21 are graphs showing the current properties of the above-described circuit using three FETs, FIGS. 19–21 respectively corresponding to the above FIGS. 15–17. As is clearly shown in FIGS. 19 and 20, the threshold value of the FET is almost completely constant without depending on the external resistance, the threshold value being approximately 2.4 V. FIGS. 19 and 20 not only indicate that the threshold value does not depend on the external resistance, but also show that the FET is clearly being activated around the threshold value (closing when the battery voltage is 2.4 V or above, and opening when less). As is consequently indicated by FIG. 21, the FET will generate heat only when the battery voltage is in an extremely narrow range around 2.4 V.

FIGS. 10 and 11 are circuit diagrams showing modes of a battery having an over-discharge preventing circuit and over-current preventing circuit using a FET other than those described above. It will be self-evident to those skilled in the art that various variations on the circuit structure can be made based on the concepts of the present invention aside from those indicated above.

Figure 22:
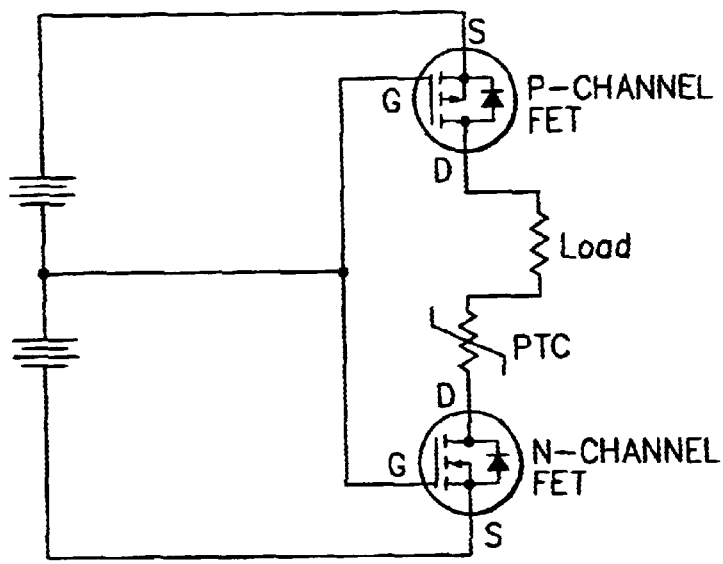
FIG. 22 is a circuit diagram showing the circuit structure whereby two FETs are respectively activated by means of a portion of the battery voltage.

FIG. 22 shows a structure wherein each of a p-type FET and an n-type FET receive part of the voltage from a plurality of batteries. In the examples shown in the drawing, the power supply portion is constructed of four batteries connected in series, with the p-type FET receiving the voltage from the two batteries on the positive electrode side and the n-type FET receiving the voltage from two batteries on the negative electrode side. As a result, since the corresponding FET will cut off the current if the voltage of either the two batteries on the positive electrode side or the two batteries on the negative electrode side drop below a predetermined threshold value, more precise control is possible in comparison to cases in which the voltage of all four batteries is considered. Whereas the circuit in FIG. 18 is such as to measure the result of multiplying the voltage of the batteries overall by a predetermined factor, the circuit of FIG. 22 differs in that the voltage of not all of the batteries, but a portion of the batteries is measured.

Figure 23:
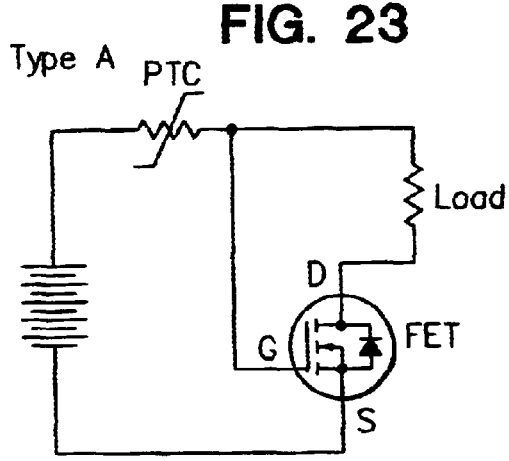
FIGS. 23 and 24 are circuit structures used in tests performed to confirm both the over-discharge protection and over-current protection properties.
Figure 24:
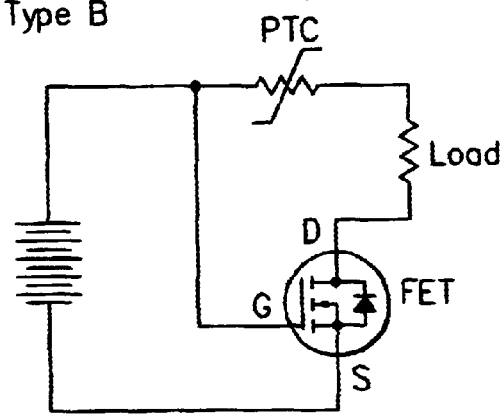

FIGS. 23 and 24 show circuit structures for tests performed to confirm the working of the over-discharge preventing function due to the FET and the over-current preventing function due to the PTC. While both use a single n-type FET and a single PTC element, the type A shown in FIG. 23 is such that the PTC element is provided on the positive electrode member side of the connection position of the gate electrode, and the type B shown in FIG. 24 is such that the PTC element is provided on the external terminal side of the connection position of the gate electrode. The tests are the same as those described above in that a variable voltage supply is used instead of the battery, and in that a number of types of resistance are used as the external resistance.

Figure 25:
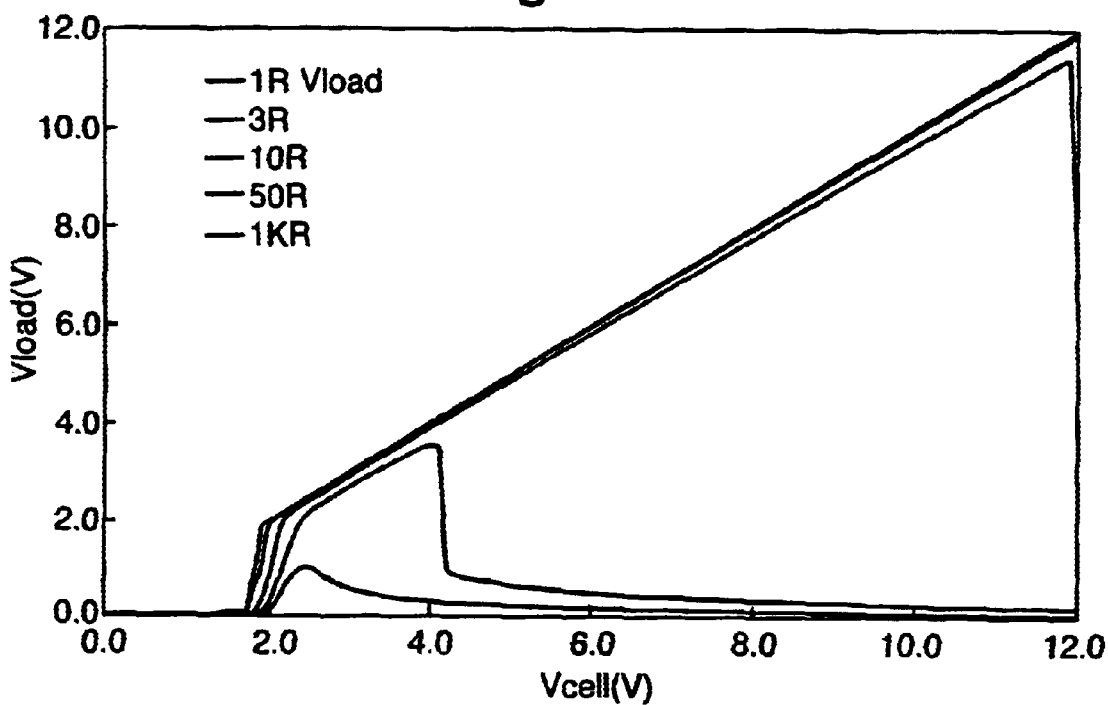
FIGS. 25 & 26 are graphs showing test results of the circuits shown in FIGS. 23 & 24.

FIG. 25 is a graph showing the test results for type A. The horizontal axis indicates the battery voltage, while the vertical axis indicates the voltage applied to the external resistance. When the battery voltage is less than roughly 2 V, the FET cuts off the current, so that the voltage applied to the external resistance is approximately zero. On the other hand, the behavior when the battery voltage exceeds roughly 2 V depends on the value of the external resistance. When the external resistance is 1Ω, the voltage applied to the external resistance will rise when the battery voltage exceeds 2 V, but will on the other hand be reduced when the battery voltage exceeds roughly 2.4 V. When the external resistance is 3Ω, the voltage applied to the external resistance will be roughly the same as the battery voltage if the battery voltage is more than 2 V, and will suddenly drop when the battery voltage exceeds 4 V. This is because the PTC element is activated to cut off the current at approximately 1.4 A. When the external resistance is 10Ω, the PTC element is activated at 12 V which corresponds to a current of roughly 1.2 A. When the external resistance is at least 50Ω, the PTC element is not be activated within the tested range. In all of the cases, the properties of the present invention wherein the FET cuts off the current when the battery current goes below the threshold value, and the PTC element cuts off the current when the current flowing through the circuit exceeds the threshold value were clearly demonstrated.

Figure 26:
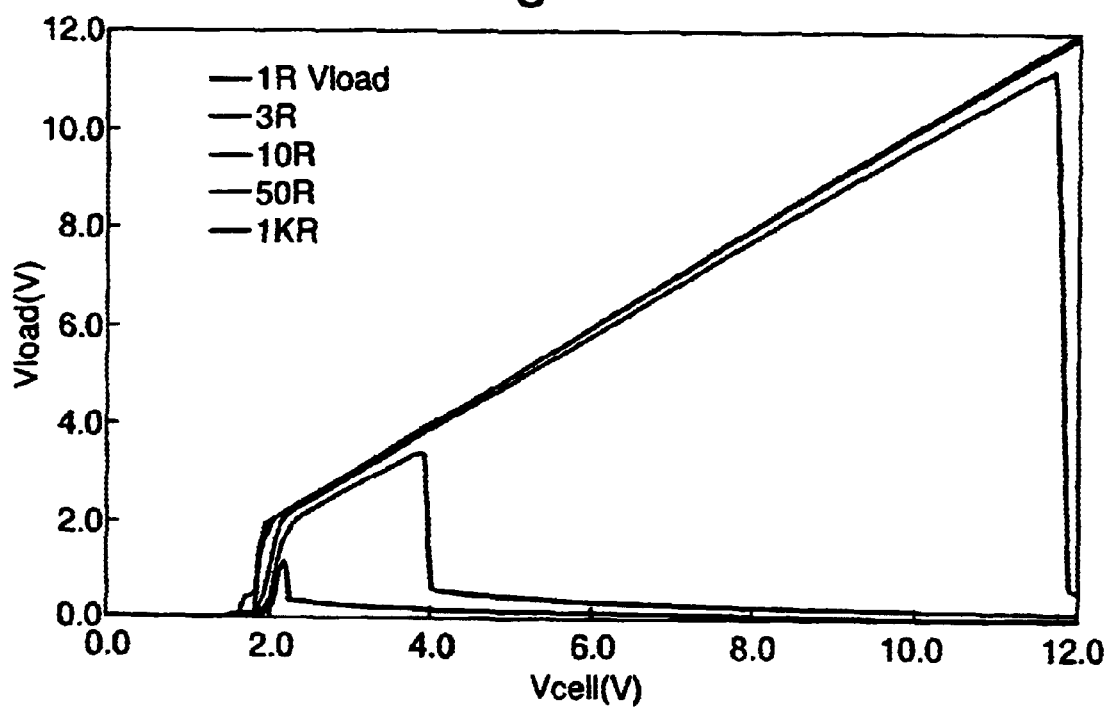

FIG. 26 is a graph showing the test results for type B. This case gave results similar to those for the test shown in FIG. 25, which illustrates that the over-discharge preventing function and the over-current preventing function can be obtained by either structure.

Figure 27:
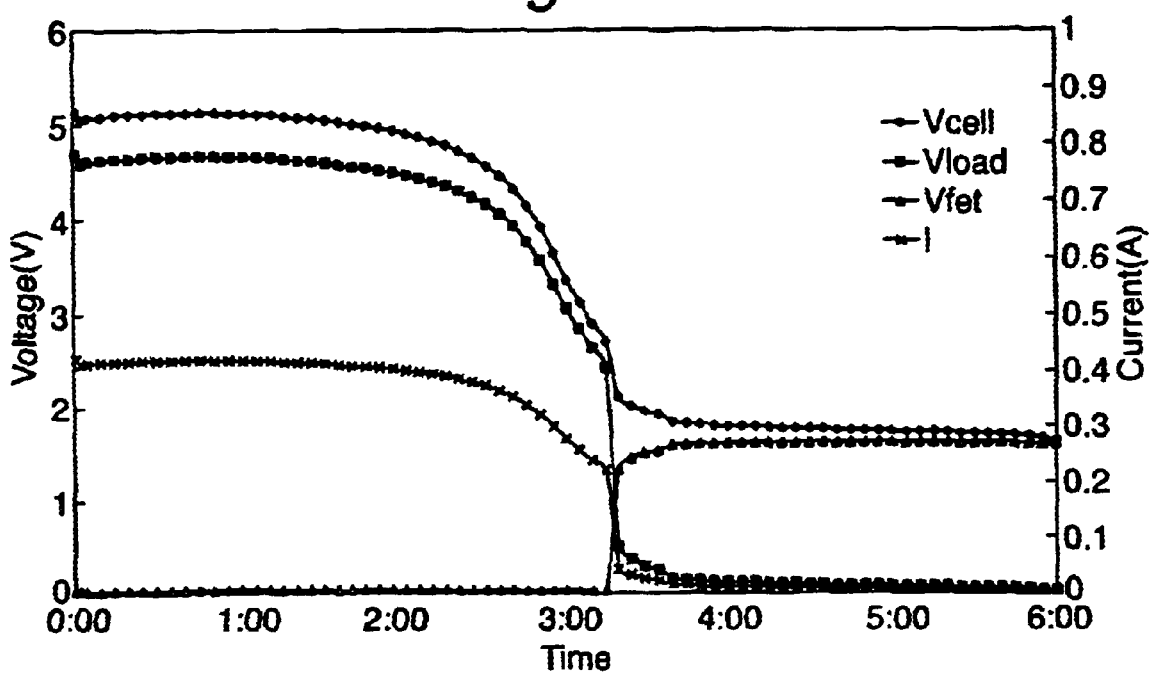
FIG. 27 is a graph showing the results of a test to confirm that the over-discharge preventing circuit is activated by a voltage drop due to discharge using a battery.

FIG. 27 is a graph showing the results of tests performed to confirm the property that the FET will cut off the current when the voltage drops below a threshold value due to discharge, using actual batteries. In FIG. 27, the horizontal axis indicates the time elapsed since beginning discharge, and the vertical axis indicates the measured voltages. The battery voltage indicated by Vcell drops from the initial 5 V with the passage of time, and becomes lower than roughly 2 V which is the threshold value voltage of the FET after about 3.3 hours. At this time, the resistance of the FET suddenly rises to roughly infinity and virtually cuts off the current, as a result of which the voltage Vload applied to the external resistance drops to roughly zero, and the voltage Vfet applied to the FET in turn becomes approximately the same value as the voltage Vload on the external resistance. Since the circuit is essentially cut off, after roughly 3.3 hours, there is no discharge from the battery and the voltage of the battery is maintained at a constant value of 2 V. As is clear from the drawing, the circuit structure of the present invention is capable of effectively protecting the battery and circuit from over-discharge.

While the above-given description of modes for carrying out the invention were made by giving examples of batteries containing an over-discharge over-current preventing circuit, the present invention is not restricted to the above-mentioned examples as already mentioned, and also encompasses battery packs having an over-discharge over-current preventing circuit, over-discharge over-current preventing circuits themselves, or other modifications which achieve the technical gist of the present invention made clear by the above explanations.

What is claimed is:

1. A primary battery comprising positive and negative electrode materials in electrical contact with electrolyte material sealed within a casing provided with external positive and negative connection areas for electrical connection to a load when the battery is in use, wherein an over-discharge protection (ODP) circuit is provided within the casing and is electrically coupled between the electrode material and one of the said connection areas so as to substantially terminate discharge of the battery when the output voltage supplied by the battery falls below a predetermined level.

2. A battery according to claim 1, wherein the ODP circuit comprises a field-effect transistor (FET) electrically connected to substantially stop the current flow in the circuit between the battery electrode material and one of the said connection areas when the said output voltage falls to a level at which the FET substantially ceases to conduct.

3. A battery according to claim 2, wherein the FET has its source electrically connected to one of the said electrode materials and has its drain electrically connected to the associated one of the said external connection areas and has its gate electrically connected to the other of the said electrode materials and to the associated other one of the connection areas.

4. A battery according to claim 2, wherein electrical connection to the gate of the FET is effected via a PTC element.

5. A battery according to claim 1, wherein an over-current protection (OCP) device is enclosed within the casing together with the ODP circuit.

6. A battery according to claim 5, wherein the OCP device comprises a PTC element.

7. A battery according to claim 5, wherein the ODP circuit and the OCP device are fixed together to form a single unit.

8. A battery according to claim 5, wherein the OCP device comprises a semiconductor integrated circuit device.

9. A battery according to claim 8, wherein the OCP integrated circuit is combined with the ODP circuit in a single semiconductor integrated circuit device.

10. A battery according to claim 5, wherein the ODP circuit and the OCP device are encapsulated to protect them from contact with the battery chemicals.

11. A battery in accordance with claim 5, wherein the OCP device is in close physical contact with ODP circuit.

12. A battery in accordance with claim 1, wherein said primary battery is a lithium battery.

13. A battery in accordance with claim 1, incorporating a FET in said ODP circuit, wherein said FET is a MOSFET.

14. A battery in accordance with claim 1, incorporating a FET in said ODP circuit, wherein said FET is a p-type FET provided near said negative electrode member.

15. A battery in accordance with claim 1, incorporating a FET in said ODP circuit, wherein said FET is an n-type FET provided near said positive electrode member.

16. A battery in accordance with claim 1, wherein the casing provides one of the electrode materials.

17. A battery in accordance with claim 1, wherein the ODP circuit is in the form of a semi-conductor device or integrated circuit.

18. A battery pack comprising:
  (a) a plurality of batteries comprising an electrolyte and a positive electrode member and a negative electrode member in electrical contact with said electrolyte said batteries being primary batteries;
  (b) a pair of external connection terminals respectively connected electrically to corresponding electrode members; and
  (c) an over-discharge over-current preventing circuit comprising a FET and a PTC element,
said PTC element and a source electrode and drain electrode of said FET being serially connected between one of the electrode members and the corresponding external connection terminal, the gate electrode of said FET being connected to the other electrode member, said FET preventing over-discharge by stopping a supply of current to the external connection terminal when the voltage between the electrode members drops below a predetermined value, and said PTC element preventing over-current by restraining the supply of current to the external connection terminal when the current between the electrode members exceeds a predetermined value, thereby also protecting the FET from being damaged by an over-current.

* * * * *